(12) United States Patent
Shah

(10) Patent No.: US 8,510,374 B2
(45) Date of Patent: Aug. 13, 2013

(54) POLLING PROTOCOL FOR AUTOMATIC LOAD LIMITING

(75) Inventor: Shital Shah, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 12/889,438

(22) Filed: Sep. 24, 2010

(65) Prior Publication Data

US 2012/0078996 A1 Mar. 29, 2012

(51) Int. Cl.
*G06F 15/16* (2006.01)

(52) U.S. Cl.
USPC ............................ 709/203; 709/224; 709/225

(58) Field of Classification Search
USPC ................. 709/203, 202, 217, 219, 223, 224, 709/225
See application file for complete search history.

(56) References Cited

U.S. PATENT DOCUMENTS

| | | | |
|---|---|---|---|
| 6,006,019 A | 12/1999 | Takei | |
| 6,560,717 B1 | 5/2003 | Scott et al. | |
| 6,996,627 B1 | 2/2006 | Carden | |
| 7,433,949 B2 | 10/2008 | Xu et al. | |
| 7,548,969 B2 | 6/2009 | Tripp et al. | |
| 7,613,126 B1 | 11/2009 | Natarajan et al. | |
| 7,657,264 B2 * | 2/2010 | Chen | 455/452.2 |
| 7,986,710 B2 * | 7/2011 | Tominaga | 370/449 |
| 8,204,032 B2 * | 6/2012 | Gao et al. | 370/346 |
| 2003/0088633 A1 | 5/2003 | Chiu et al. | |
| 2003/0140092 A1 * | 7/2003 | Caruso et al. | 709/203 |
| 2006/0075420 A1 * | 4/2006 | Ludvig et al. | 725/9 |
| 2006/0206607 A1 * | 9/2006 | Carden | 709/224 |
| 2007/0027987 A1 * | 2/2007 | Tripp et al. | 709/225 |
| 2008/0186884 A1 * | 8/2008 | Ahn et al. | 370/310 |
| 2009/0059950 A1 | 3/2009 | Gao et al. | |

OTHER PUBLICATIONS

Dinan, et al., "Dynamic Load Balancing of Unbalanced Computations Using Message Passing", Retrieved at << http://www.cs.unc.edu/~olivier/pmeo07.pdf >>, Parallel and Distributed Processing Symposium, IEEE International, Mar. 26-30, 2007, pp. 8.

* cited by examiner

*Primary Examiner* — Ruolei Zong

(57) ABSTRACT

A client-specific or client-independent polling interval is provided to each client dynamically based on server load. The polling interval can be provided in the server polling response sent in response to a client polling request. The polling interval can be determined using a feedback control system or using a Bucket Reservation Method. The server uses a next polling interval and a flag that indicates if the previous polling request was ignored. Using these two parameters the server can continuously control the polling frequency from the client to achieve optimal performance.

20 Claims, 5 Drawing Sheets

POLLING PROTOCOL FOR AUTOMATIC LOAD LIMITING

BACKGROUND

The process of one computer communicating with another computer at intervals for the purpose of obtaining information or to perform an action is referred to as polling. For example, when a device or service (a client) wants to retrieve data or perform an action on another device or service (a server), the client can poll the server. Polling occurs in many different types of applications including stock price update applications that display current prices for stocks every so often, weather applications that update temperature every so often, and email applications that check for new emails every so often, to mention just a few of many possible applications.

In some polling applications, the client polls the server at some fixed interval or the server sends updates to the client at a fixed interval. Simple optimizations of fixed interval polling can include reducing unnecessary polling. For example, a weather application may detect when a client is idle and stop sending updates until the client becomes active again. A stock price update application may reduce polling frequency after the close of the trading day.

SUMMARY

To address these and other aspects of polling scenarios, polling interval can be repeatedly adjusted to prevent potential server overload, even in the event of a sudden increase in the number of clients. Polling interval can be continuously adapted based on current server utilization. Polling interval can be decreased when server utilization is lower and can be increased when server utilization is higher. Continuous adaptation of the polling frequency can result in a increased performance and a more favorable user experience.

Instead of using a fixed polling interval, a polling interval can be dynamically calculated based on current level of server load. The next polling interval can be calculated by the server and supplied to the client by the server in the message sent to the client by the server in response to the polling request. Each client polling the server can be supplied with its own polling interval so that two clients that poll the same server can have different polling rates. The polling rate for a client can change with every response from the server. The next polling interval can be calculated based on one or more algorithms so that the cumulative polling request rate of all the clients approximates a desired request rate.

A polling request can include input parameters specified by the client and sent to the server for each poll or at an interval determined by the server. In response, the server can generate a polling response with particular application-specific output values and return the generated polling response to the client. In addition to the particular application-specific output values, the server polling response can include a value that specifies how long the client is to wait before sending the next polling request (a "schedule next request after" value). The value that specifies how long the client is to wait before sending the next polling request can replace the fixed or configurable polling interval to that indicated by the "schedule next request after" value for the client, thus allowing the polling interval to be dynamically adjusted for each individual client. Moreover the dynamically adjustable polling interval can be adjusted for each polling request, allowing a polling interval to be tuned to current operating conditions of the server.

In addition to including the value that specifies how long the client is to wait before sending the next polling request, the server polling response can optionally include a value that indicates whether the client polling request was ignored by the server. When the client polling request is ignored, other values in the polling response can be arbitrary or invalid values or can be an outdated value because the server did not update it. The value that indicates that the client polling request has been ignored (the "is request ignored" value) can be used when a client disregards the "schedule next request after" value. For example, if a client ignores the "schedule next request after" value and sends a next polling request before the time indicated by the "schedule next request after" value, the server can ignore requests from the client and indicate to the client that it has done so by sending the "is request ignored" value. The "is request ignored" value can be used to handle transient responses during which a server chooses to ignore requests such as, for example, when a feedback control system is slow to converge.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Sometimes, predicting the number of clients that will be polling a server or group of servers providing a particular service, is difficult or impossible. In such an event, fixed polling intervals with or without optimizations can overwhelm a server and can result in shutdown of the server or poor performance. Fixed polling intervals can also result in underutilization of the server when the number of polling clients is low.

Consider, for example, a weather applet that uses two servers in a cluster to serve polling requests. During storms the applet may receive many more polling requests than normal. The capacity of the servers may be exceeded and the applet may fail, disappointing users who relied on the applet. Similarly, an email client might check mail on servers every 10 minutes, based on analysis by system administrators of peak usage periods. Outside the peak usage periods, however, the servers might be underutilized because the polling interval is set so that the servers will not be overwhelmed during peak usage periods.

To address these and other aspects of polling systems, a refresh interval is varied over time for each client accessing a server so that the total rate of requests made on the server by all the clients remains substantially constant and approaches an ideal or desired number of requests to fully utilize the server without overwhelming it. A next polling interval can be provided to each client by the server in the server polling response.

Polling Protocol for Automatic Load Limiting

Figure 1:
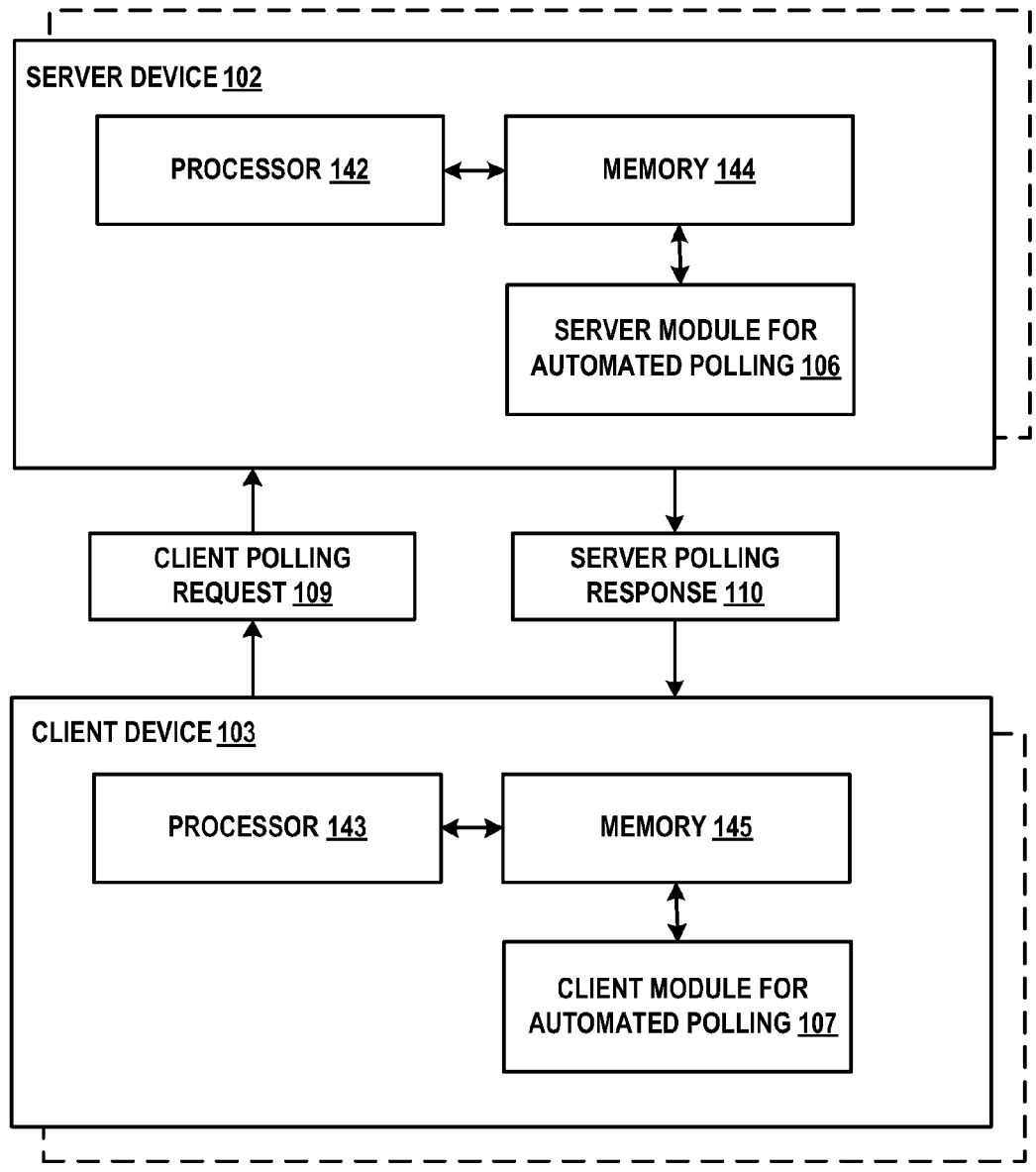
FIG. 1 illustrates an example of a system 100 for automatic load limiting in accordance with aspects of the subject matter disclosed herein.

FIG. 1 illustrates an example of a system 100 for automated polling in accordance with aspects of the subject matter disclosed herein. All or portions of system 100 may reside on one or more computers such as the computers described below with respect to FIG. 4. All or portions of system 100 may operate in a network environment such as the one described with respect to FIG. 3. System 100 or portions thereof may be provided as a stand-alone system or as a plug-in or add-in.

System 100 may include one or more of: one or more devices 102 including a processor (such as processor 142), a memory such as memory 144, and a server module for automated polling 106 as described herein. Other components well known in the arts may also be included but are not here shown. It will be appreciated that the server module for automated polling 106 can be loaded into memory 144 to cause one or more processors such as processor 142 to perform the actions attributed to the server module for automated polling 106. Device 102 may represent a server computer that receives requests from one or more client computers and returns results (e.g., responses to the received client request) or performs actions requested by the client. Device 102 and 103 may represent computers in a peer-to-peer network in which case devices may poll each other and hence they are both client and server at the same time for one another.

System 100 may include in addition to or instead of, one or more devices 103 including a processor (such as processor 143), a memory such as memory 145, and a client module for automated polling 107 as described herein. Other components well known in the arts may also be included but are not here shown. It will be appreciated that the client module for automated polling 107 can be loaded into memory 145 to cause one or more processors such as processor 143 to perform the actions attributed to the client module for automated polling 107. Device 103 may represent a client computer that sends requests to one or more server computers and receives results (e.g. responses to the sent client request). Device 103 may also represent a computer in a peer-to-peer network. The client device 103 may create a request and send the request to server device 102. The request sent to the server device 102 can be a polling request such as client polling request 109 and can include application-specific parameters created by the client device 103 and sent to the server device 102 at each poll.

The server module for automated polling 106 can receive the polling request 109 from the client device 103 and in response, the server device 102 can create a polling response such as polling response 110 and can return the polling response to the client device 103. The polling response created by the server device 102 may include application-specific output values. The polling response may also include a "schedule next request after" value or parameter. In accordance with some aspects of the subject matter disclosed herein, the "schedule next request after" value may specify a particular time (e.g., 11:59:00) so that the client module for automated polling 107 can determine the time (e.g., at 11:59:00 or thereafter) at which the next poll can be sent by the client device 103 to the server device 102. The "schedule next request after" value may specify a time span interval (e.g., 1 millisecond) after which the next poll can be sent (e.g., the next poll can be sent one millisecond after the time at which the previous poll was sent). The "schedule next request after" value may also specify an approximate or inexact interval or timespan instead of an absolute value. For example, the server can return a next polling interval as "anytime between 6 seconds to 10 seconds" instead of an absolute value of, for example, "8 seconds". Alternatively the server can change the polling interval at some interval selected by the server (e.g., every 5 minutes) instead of with every client polling request.

The client module for automated polling 107 can replace its previous polling interval with the interval indicated by the "schedule next request after" value received in the polling response received from the server device 102. The "is request ignored" value can be a value that tells the client device 103 whether or not its previous polling request was ignored. The presence of an "is request ignored" field in the server polling response can indicate that the server ignored the previous client polling request. Alternatively, the value included or contained within the "is request ignored" field may be a Boolean value that indicates that the previous client polling request was ignored or a Boolean value that indicates that the previous client polling request was not ignored. If the server ignored the previous client polling request, the application-specific output values might not have been updated by the server and/or might contain arbitrary or invalid response data.

Instead of sending the "schedule next request after" parameter as part of the server polling response, the "schedule next request after" parameter can be sent in a separate service or protocol for dynamic interval adjustment. A dynamic polling interval for future polling requests can be calculated by the server module for automated polling 106 using feedback control or the Bucket Reservation method described herein. A feedback control system varies one or more variables to achieve a desired result. The feedback control system for a system as described herein can vary polling intervals for each of its clients to achieve a desired server polling rate. A polling interval T for a particular time t for a particular client or all clients can be represented as T(t). A rate of polling requests can be represented by R(t) and the number of clients currently making requests can be represented by N(t). T(t) (a polling interval for a client over time) can be calculated via the following formula:

$$R(t) = \frac{N(t)}{T(t)}$$

The number of clients currently making requests N(t) can be an uncontrollable variable and can be unpredictable. For example, in some applications client devices may have their own optimizations (e.g., idle state detection) that affect whether a client polling request is made. In situations including this one, a control system can be modeled by having T(t) (client polling interval) as a feedback signal and R(t) (rate of polling requests) as output. The goal of the control system can thus be to adjust T(t) (client polling interval) so that R(t) (rate of polling requests) is as close to a desired refresh rate $R_d$ regardless of any changes in N(t) (number of clients currently making requests). The server module for automated polling can calculate T(t+1) (the next polling interval) so that R(t+1) (the next rate of polling requests) is as close to $R_d$ as possible.

The calculation:

$$T(t+1) = T(t)\frac{R(t)}{R_d}$$

can be used to cause the next polling interval T(t+1) to increase in the same proportion as the number of current polling requests R(t) has increased beyond the desired rate $R_d$ or to decrease in the same proportion as R(t) has decreased beyond the desired rate $R_d$.

A filter can be applied to help to prevent spikes in usage request rates that could potentially overwhelm the server. Application of filters such as but not limited to a low pass filter implemented using exponential averaging can result in a smoothened signal $f_e$ for a given input signal f(t) as can be obtained by the following equation:

$$f_e(t+1) = \lambda f_e(t) + (\lambda-1)f(t)$$

$0 \leq \lambda \leq 1$ can be the smoothening factor. When $\lambda$ approaches 1 the latest values have less significance compared to historical values and thus sudden changes are dampened. An exponential averaging filter can be applied to either T(t) (client polling interval) or to R(t) (rate of polling requests made on the server) or to both. When the exponential averaging filter is applied to both T(t) (client polling interval) and to R(t) (rate of polling requests) the feedback calculation becomes:

$$T(t+1) = T_e(t) \cdot \left[\frac{R_e(t)}{R_d}\right]^k$$

with, $$T_e(t+1) = \lambda T_e(t) + (\lambda-1)T(t+1)$$

$$R_e(t) = \eta R_e(t-1) + (\eta-1)R(t)$$

A new parameter k can be added to further dampen sudden changes. With more stringent exponential weights and damping factors such as but not limited to $\lambda=\eta=0.1$ and k=0.5, sudden changes in R(t) do not exceed sudden changes in N(t), the system can take longer to converge in some conditions (e.g., such as but not limited to step and ramp inputs).

In addition to the ones described above, other standard filters can be applied other than exponential moving average. For example, filters based on Recursive Least Square (RLS), other regression techniques or neural networks can be used to evaluate an estimate for R(t) or N(t) and T(t) can be accordingly recalculated.

Figure 2A:
FIG. 2a is an example of pseudo code that implements aspects of the subject matter disclosed herein.

The pseudo code 250 displayed in FIG. 2a is one possible example based on an implementation of an exponential moving averaging filter.

In accordance with aspects of the subject matter disclosed herein, an adaptive polling interval can also be implemented using a new algorithm that is referred to as the Bucket Reservation Method herein. In this method a timeline is created, starting at $t_0=0$ with intervals $t_1, t_2$ and so on so that $t_{n+1}=t_n+\Delta t$ where $\Delta t$ is selected so that $C\Delta t = R_d$ where C and $\Delta t$ are some constants. That is, the timeline can be visualized as a line that is divided into small constant intervals where each interval is a bucket that can be utilized by a client making a polling request.

The first client making a polling request can be assigned a bucket $t_0$. The second client making a polling request can be assigned the bucket $t_1$ and so on, such that polling request k is assigned bucket $t_k$ where the bucket to which the client is assigned tells the client when to send the next polling request. The server device 102 can keep track of the next available bucket $t_n$. When $t_n$ is assigned to a client it is incremented by $\Delta t$ so that each next calling client gets a client-specific or client-independent bucket $t_k$.

To clarify, suppose a website responds to polling requests for stock quotations. The website starts at 12:00 am. A desired total polling request rate on the server is $R_d=1$ polling request per minute irrespective of increases or decreases in actual polling rate to avoid underutilization or overutilization of the server. A list of available buckets thus can include buckets for 12:01 am, 12:02 am and so on. When a first client calls for a stock quote at 12:00:01 am, the first available bucket, i.e., the bucket for 12:01 am can be assigned to it and the "schedule next request after" parameter can be set to 59 seconds (T= (12:01 am–12:00:01 am)=59 seconds. If the next (second) client calls in at 12:00:02 am the next bucket (the bucket for 12:02 am or T=118 seconds (59*2) can be assigned to the second client and so on. The above method maintains a refresh rate as close to $R_d$ as possible regardless of traffic patterns and without needing to measure actual refresh rates or delays in filters described above.

When a value T is returned to a client, the client may not necessarily poll the server again at the polling time sent to the client by the server. That is, there is a probability $\rho<1$ that the bucket will actually be used. If the probability is assumed to be 100% ($\rho=1$) and it is not, efficiency might fall and the actual refresh rate can be less than the desired refresh rate. An ongoing count of unused buckets can be maintained and the probability for unused buckets can be calculated. This count then can be used to perform multiple assignments to a single bucket where the bucket receiving multiple assignments has the same probability to get used by multiple clients (instead of only one client) as the calculated probability.

Figure 2B:
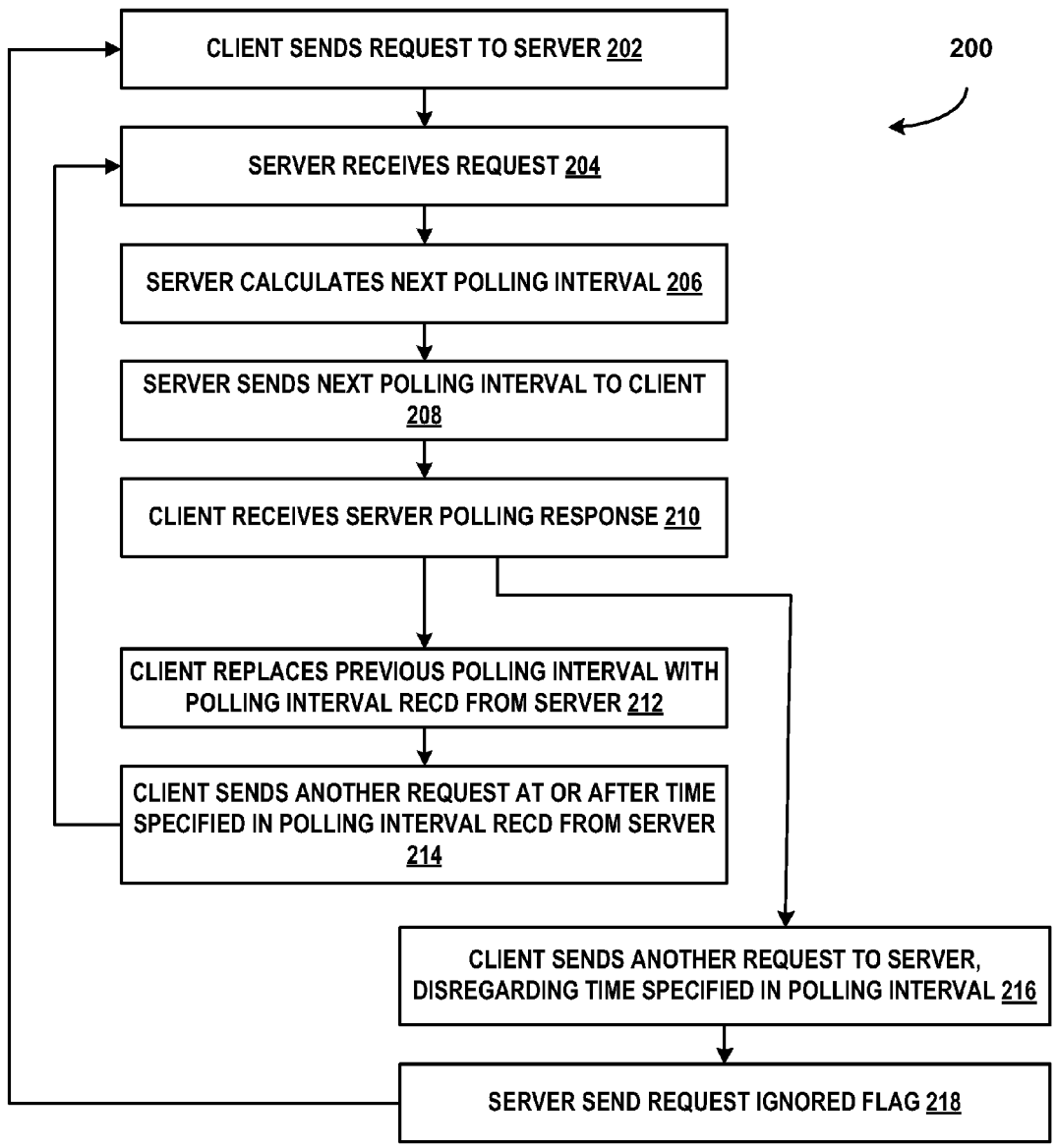
FIG. 2b is a flow diagram of an example of a method 200 for automatic load limiting in accordance with aspects of the subject matter disclosed herein.

FIG. 2b illustrates an example of a method 200 for automated polling in accordance with aspects of the subject matter disclosed herein as can be practiced by a system such as the one described in FIG. 1. At 202 a client device can send a client polling request to a server. As described above the client polling request can include input parameters specified by the client. At 204 the server device can receive the client polling request. At 206 the server can generate a polling response with particular application-specific output values. In addition to the particular application-specific output values, the server polling response can include a value that specifies how long the client is to wait before sending the next polling request (a "schedule next request after" value), as described above. The "schedule next request after" value can be calculated via the feedback control mechanism or the Bucket Reservation Method described above. In accordance with aspects of the subject matter disclosed herein, the feedback control mechanism can be implemented by measuring the current rate of requests made on the server and applying the above described filters on one or both of the polling interval and the rate of polling requests made on the server. The "schedule next request after" value can also be calculated via the bucket reservation mechanism described above. At 208 the server can send the server polling response and the new "schedule next request after" value to the client. As described above, in addition to the "schedule next request after" value, the server may include an "is request ignored" value as described above.

At 210 the client can receive the server polling response. Optionally at 212 the client can replace its previous polling interval as indicated by the "schedule next request after" value. At 214 the client can send a next client polling request at or after the time as indicated by the "schedule next request after" value and processing can continue at 204. Alternatively, at 216 the client can send a new polling request to the server prior to the time indicated by the "schedule next request after" value. At 218 in response to receiving the new polling request prior to the time indicated in its previous response the server can create an "is request ignored" value indicating that other values in the server polling response may be invalid or not updated by the server. Processing can continue at 202.

In accordance with other aspects of the subject matter disclosed herein, the "is request ignored" field can be generated and sent to the client with each server polling response and can include a Boolean value that indicates that the server has ignored the previous client polling request or can include a Boolean value that indicates that the server has not ignored the previous client polling request. The method described above enables dynamic updating of the current polling interval to maximize system utilization by adjusting to changes in system traffic and can be employed to implement automatic load limiting.

Figure 3:
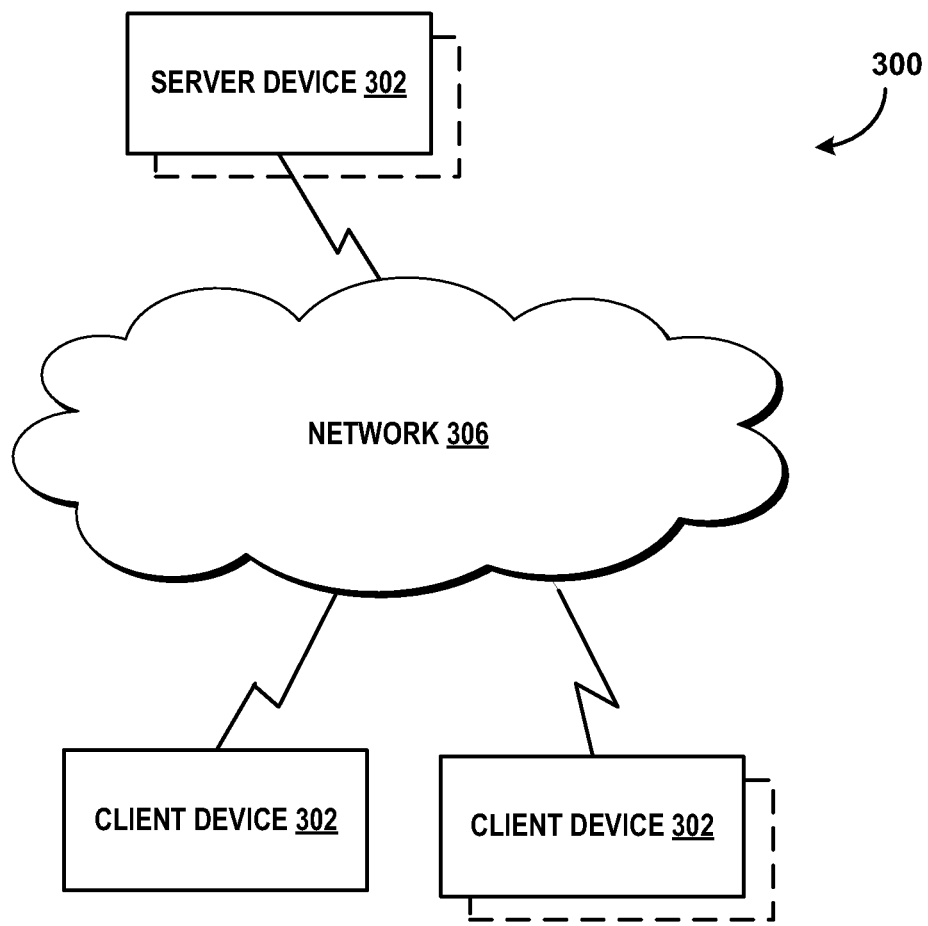
FIG. 3 is a block diagram illustrating an example of a network environment in which aspects of the subject matter disclosed herein may be implemented.

FIG. 3 illustrates an example system 300 implementing the automated polling system in accordance with aspects of the subject matter disclosed herein. System 300 can include multiple (n) devices 302 that can communicate via a communicative interface including but not limited to a network such as network 306. A polling system such as the one described herein can also be implemented without network environment or full computers. For example, a hardware component can poll for readiness of another component by polling over a wire. Similarly, a polling system can also be implemented on a device such as but not limited to a wireless computer mouse that polls for its base station over radio frequencies, a digital photo frame, a desk lamp that polls ambient light to adjust its brightness or color and so on. Network 306 can by any of a variety of different networks, including the Internet, a local area network (LAN), a public telephone network, an intranet, or any other public and/or proprietary network or combination thereof and so forth. Each device 302 can be any of a variety of different devices capable of running (e.g., consuming) software. For example, a device 302 can be a desktop computer, a server computer, a mobile station, an entertainment appliance, a set-top box communicatively coupled to a display device, a wireless telephone, a personal digital assistant, a game console, an automotive computer and so on. Thus devices 302 can range from full resource devices with substantial memory and processor resources (e.g., personal computers, game consoles) to low-resource devices with limited memory and/or processing resources (e.g., traditional set-top boxes, hand-held game consoles).

Moreover, a polling system such as the one described herein can be used without a network environment or computers. For example, a hardware component can poll for readiness of another component by polling over a wire. A wireless computer mouse can poll for its base station over radio frequencies. Other examples include but are not limited to: a digital photo frame, a desk lamp that polls ambient light to adjust its brightness or color and so on.

Example of a Suitable Computing Environment

Figure 4:
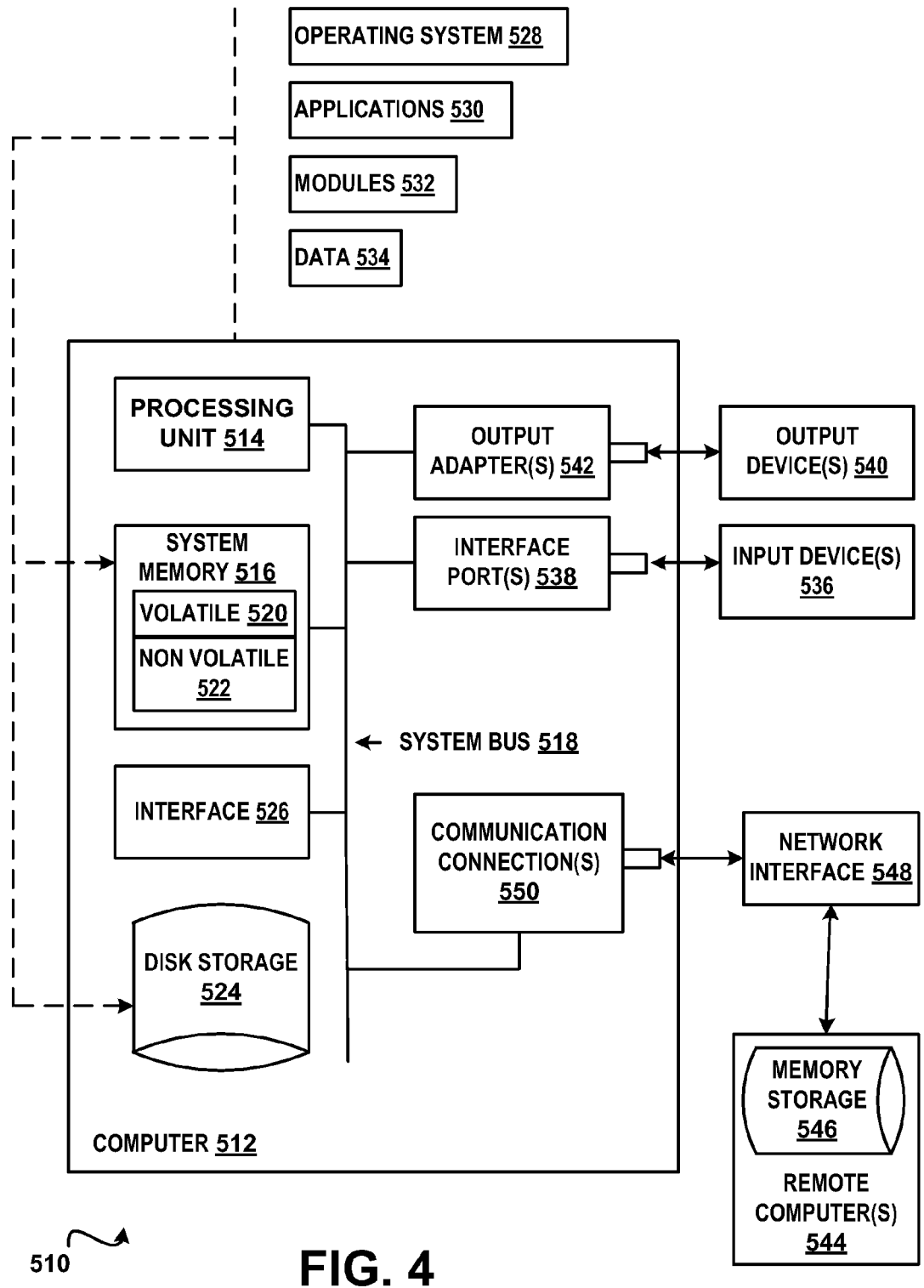
FIG. 4 is a block diagram of an example of a computing environment in accordance with aspects of the subject matter disclosed herein.

In order to provide context for various aspects of the subject matter disclosed herein, FIG. 4 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 4, a computing device in the form of a computer 512 is described, although it will be appreciated by those of skill in the art that the subject matter disclosed herein can be implemented on a hardware chip that performs the functions described herein without needing the main processor, memory and so on of the computer described below. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 4 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
    a processor and a memory; and
    a module configured to cause the processor to repeatedly adapt rate of polling by a plurality of clients on a server based on current utilization of the server by:
        calculating a next polling interval for a client of the plurality of clients, the next polling interval being calculated by a bucket reservation mechanism in which a first request received by the server from the plurality of clients is assigned a first bucket of a plurality of buckets and a second request is assigned a second bucket of the plurality of buckets, and each bucket of the plurality of buckets is associated with a time interval, such that when the plurality of buckets is utilized, a desired refresh rate is maintained regardless of a number of the plurality of clients making polling requests to the server; and
        sending the calculated next polling interval to the client in a server polling response sent by the server to the client.

2. The system of claim 1, wherein the next polling interval for the client sent by the server is recalculated for each server polling response sent to the client.

3. The system of claim 1, wherein the rate of polling is dynamically adjusted for each polling request to tune the rate of polling of the server to current operating conditions of the server.

4. The system of claim 1, wherein the server polling response comprises a value that indicates a client polling request was ignored by the server in response to receiving a client request disregarding the calculated next polling interval for the client.

5. The system of claim 1, wherein the calculated next polling interval for the client is calculated on the server based on a feedback control mechanism that varies polling intervals for each of the plurality of clients to achieve a desired server polling rate.

6. The system of claim 5, wherein a filter implemented using exponential averaging is applied to at least one of the next polling interval or a rate of polling requests made on the server.

7. The system of claim 1, wherein the module is further configured to cause the processor to repeatedly adapt rate of polling by a plurality of clients on a server based on current utilization of the server by:
    maintaining a count of unused buckets; and
    assigning requests for multiple clients of the plurality of clients to an unused bucket.

8. A method comprising:
    receiving by a server module executing on a server computer a request from a client executing on a client computer;
    calculating a next polling interval for a plurality of clients polling the server computer, to continuously adapt a rate of polling requests received on the server computer based on current server utilization, using a bucket reservation mechanism in which a first request received on the server from the plurality of clients is assigned a first bucket and a second request from the plurality of clients is assigned a second bucket of a plurality of buckets, and the plurality of buckets are each associated with a time interval, such that when the plurality of buckets is utilized, a desired refresh rate is maintained regardless of a number of the plurality of clients making polling requests to the server; and sending the next polling interval for a client of the plurality of clients to the client computer in a server polling response.

9. The method of claim 8, further comprising:

calculating the next polling interval using a feedback control mechanism in which polling interval is varied for each of the plurality of clients to achieve a desired server polling rate.

10. The method of claim 9, wherein the next polling interval is calculated by applying an exponential averaging filter to a previous client polling interval.

11. The method of claim 9, wherein the next polling interval is calculated by applying an exponential averaging filter to a rate of polling requests made on the server.

12. The method of claim 8, wherein the server polling response comprises a value that indicates a client polling request was ignored by the server computer in response to receiving a client request disregarding the calculated next polling interval for the client.

13. The method of claim 8, wherein the next polling interval for the client sent by the server is recalculated for each server polling response sent to the client.

14. The method of claim 8, further comprising:

maintaining a count of unused buckets; and assigning requests for multiple clients of the plurality of clients to an unused bucket.

15. A computer-readable storage device having computer-executable instructions recorded thereon which when executed cause at least one processor to:

continuously adapt rate of polling of a server based on current utilization of the server by causing the at least one processor to:

calculate a next polling interval for a client of the plurality of clients using a bucket reservation mechanism in which a first client of the plurality of clients is assigned a first bucket of a plurality of buckets and a second client of the plurality of clients is assigned a second bucket of the plurality of buckets, and the plurality of buckets is associated with an interval of time such that when the plurality of buckets is utilized, a desired refresh rate is maintained regardless of a number of the plurality of clients making polling requests to the server; and send the calculated next polling interval to the client in a server polling response sent by the server to the client.

16. The computer-readable storage device of claim 15, comprising further computer-executable instructions, which when executed cause the at least one processor to:

calculate the next polling interval for the client based on a feedback control mechanism that varies polling intervals for each of its clients to achieve a desired server polling rate.

17. The computer-readable storage device of claim 16, comprising further computer-executable instructions, which when executed cause the at least one processor to:

calculate the next polling interval by applying a filter implemented using exponential averaging to at least one of the next polling interval or a rate of polling requests made on the server.

18. The computer-readable storage device of claim 15, comprising further computer-executable instructions, which when executed cause the at least one processor to:

indicate that a client polling request was ignored by the server in response to the client disregarding the calculated next polling interval for the client.

19. The computer-readable storage device of claim 15, comprising further computer-executable instructions, which when executed cause the at least one processor to:

tune the rate of polling to current server operating conditions by dynamically adjusting the polling interval for each polling request received by the server.

20. The computer-readable storage device of claim 15, comprising further computer-executable instructions, which when executed cause the at least one processor to:

maintain a count of unused buckets; and assigning requests for multiple clients of the plurality of clients to an unused bucket.

\* \* \* \* \*